United States Patent [19]
Haubtmann

[11] 3,750,326
[45] Aug. 7, 1973

[54] BAIT BOX FOR RATS AND MICE
[75] Inventor: Henri Haubtmann, Schiltigheim, France
[73] Assignee: Bayer Aktiengesellschaft, Leverkusen, Germany
[22] Filed: Oct. 22, 1970
[21] Appl. No.: 82,886

[30] Foreign Application Priority Data
Apr. 22, 1970  Germany.................. P 20 19 334.4

[52] U.S. Cl. ................................................ 43/131
[51] Int. Cl. ...................... A01m 1/20, A01m 25/00
[58] Field of Search......................... 43/131; 229/27

[56] References Cited
UNITED STATES PATENTS
2,650,451  9/1953  Karstedt................................ 43/131
3,015,184  1/1962  Scott et al............................ 43/131
3,025,630  3/1962  Silvey................................... 43/131

Primary Examiner—Warner H. Camp
Attorney—Burgess, Dinklage & Sprung

[57]  ABSTRACT

A bait box and a one piece blank which can be set up to form the box. The blank includes side wall sections, upper and lower base wall sections, and end wall sections. Openings are formed in the end wall sections and serve as entrances and exits for the rodents. One side wall includes two side wall sections, one overlying the other and the innermost of the two sections is provided with holes for anchorage of the poison bait, while the outermost of the two sections covers the bait where it projects outwardly from the anchoring holes.

8 Claims, 3 Drawing Figures

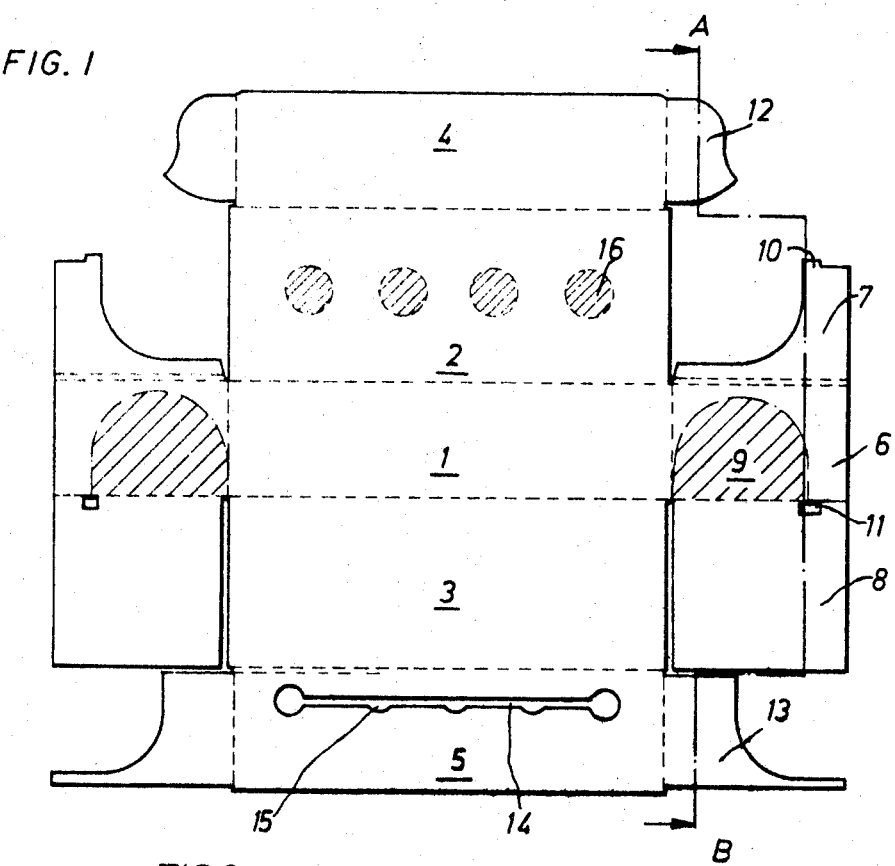
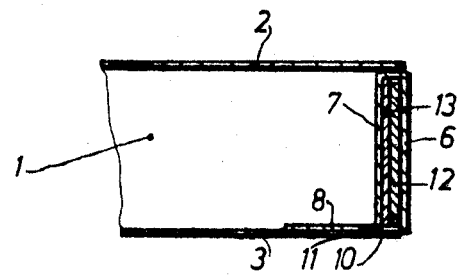

BAIT BOX FOR RATS AND MICE

This invention relates to a bait box in the form of a folding box for rats and mice.

Traps for rats, mice and other rodents are known in various forms. Unfortunately, all the known traps are ready for dispatch in their final dimensions and accordingly give rise to considerable difficulties in regard to transportation and storage. Secondly, traps of this kind are normally used for a given period only and the rest of the time they have to be put away somewhere or other. They become dirty or the place where they have been put away is forgotten, so that they are either unusable or unavailable when they are needed.

The object of the present invention is to provide a trap for rats and mice which is both inexpensive and easy to handle so that it can be discarded after single or repeated use and which in addition minimizes transportation and storage costs for the manufacturer and consumer.

According to the invention, this object is achieved by a poison bait box for rats and mice, characterized by a cardboard cut-out consisting of sections for side walls, base and end walls seperated from one another by fold lines, one side wall forming the center part of the cut-out, while the other side wall consists of two sections which can be placed one on top of the other, the inner side wall section having tabs which can be folded around and placed against the end wall sections from inside, and being further distinguished by the fact that the end wall sections are provided with upper and lower insert tabs preferably equal in width to the base sections which can be placed against the base sections from inside, at least one of the end wall sections being pre-punched with a slip hole, and by the fact that the outer side wall section is also provided with foldable insert tabs which can be inserted between the tabs of the inner side wall sections and the end wall sections.

A cardboard cut-out of this kind can readily be transported and stored in its unfolded form. Instructions showing the user how to assemble the cutout can readily be printed on the outside. The bait for the rodents is placed in the bait box before it is finally closed.

One of the wall or base sections is preferably provided with anchorage holes for the baits. The inner side wall section has proved to be particularly effective for accommodating the anchorage holes, because it is covered by the outer side wall section so that the baits cannot be removed from outside. The anchorage holes are preferably in the form of convex projections from an elongated common slot parallel to the base.

Although the bait box is made of a lightweight material such as card, cardboard or plastics film, it is nevertheless very stiff by virtue of the creasing and folding so that it exhibits sufficient strength under normal stressing.

In one particularly advantageous embodiment of the bait box, the box is further stiffened by providing the upper insert tabs of the end wall sections with a recess adapted to the slip holes and, at its end, with tongues which after having been folded around the tabs of the inner side wall sections engage in holes cut out of the lower tabs of the end wall sections in the vicinity of the fold lines. In this way, the tabs of the outer side wall sections can be inserted into a form of sleeve. All the tabs are of course shaped in such a way that when the box is assembled they do not cover the slip holes provided in the end wall sections.

The fold lines and folds in the cardboard cut-out are preferably offset relative to one another or made double so that allowance is made for the thickness of the cardboard when the cut-out is asembled. In this way, the bait box is made easy to assemble and remains dimensionally stable. However, these measures are generally known in folding boxes.

In one advantageous embodiment of the bait box according to the invention, the upper base section is provided with pre-punched inspection holes. These inspection holes enable the baits to be visually observed from outside. Preferably both the slip holes and the inspection holes are only pre-punched in the cardboard cut-out. The centers have to be subsequently pressed out by the user. In actual fact, it does not matter whether these holes are punched out during manufacture or not. However pre-punching the holes so that the centers are left in the cutout increases protection of the cardboard cut-out against damage during transportation and storage.

It has proved to be of particular advantage to provide the upper surfaces of the bait box with a water-repellant layer. This has the advantage that the cardboard is protected against moisture. Naturally there is no need for this where the box is made from waterproof plastics film.

One embodiment of the bait box according to the invention is described in the following and illustrated diagrammatically in the accompanying drawing, wherein:

FIG. 1 is a plan view of the cardboard cut-out.

FIG. 2 is a section on the line A-B of FIG. 1 through an assembled bait box.

Figure 3:
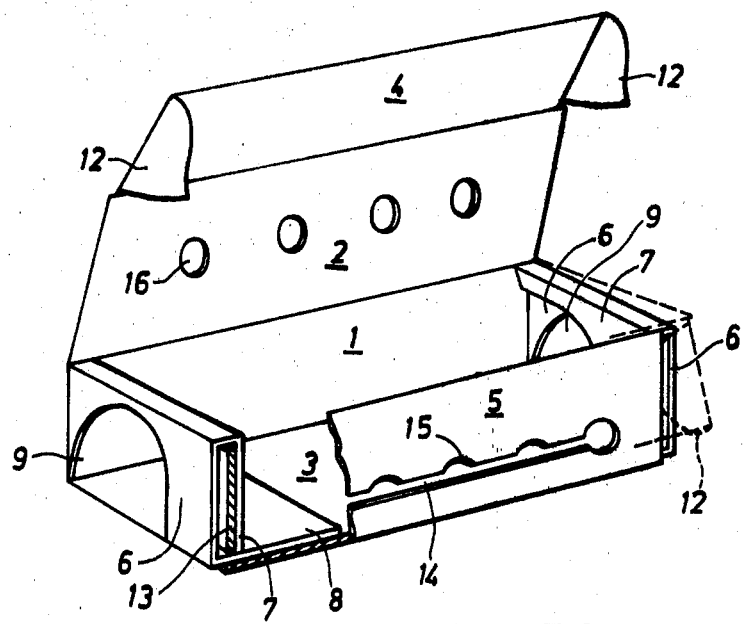
FIG. 3 is a view of the box in set up condition.

As shown in FIG. 1, the cardboard cut-out consists of a center part 1 adjoined by an upper base section 2 and a lower base section 3. The base section 2 is adjoined by one side wall section 4 while the base section 3 is adjoined by another side wall section 5. End wall sections 6 are flanged on to the left and right of the center section 1. These end wall sections are provided with an upper insert tab 7 and a lower tab 8. Slip holes 9 for entrance and exit of the rodents are pre-punched into the end walls 6. The upper tabs 7 have cut out portions corresponding to the slip holes 9, i.e., tabs 7 are shaped in such a way that they do not cover the slip holes 9 when the cardboard cut-out is assembled. In addition, the insert tabs 7 carry at their ends tongues 10 which can be inserted into openings 11 in the lower tabs 8 after the tabs 7 and 8 have been folded accordingly. The side wall sections 4 and 5 have tabs 12 and 13, respectively, which are shaped in such a way that they do not cover the slip holes 9 when the box is assembled. Provided in the side wall section 5 there is a slot 14 which has anchorage holes for the baits in the form of convex projections 15. Inspection holes 16 are pre-punched in the base section 2. All the fold lines are shown in chain lines and are not numbered.

There now follows a brief description of how the cardboard cut-out is assembled to form the bait box:

First of all, all the fold lines marked on the cardboard cutout have to be flexed so that the box can be subsequently assembled without difficulty. The slip holes 9 and inspection holes 16 pre-perforated in the end wall sections 6 and in the upper base section 2 are then punched out. The lower base section 3 is then folded through 90° towards the center part, after which the lower tabs 8 of the end wall sections 6 are folded upwards and the end wall sections 6 folded 90° towards the center part. The side wall section 5 is then folded upwards and the tabs 13 placed against the end wall sections 6 from inside. The upper insert tabs 7 are then folded around the tabs 13 and their tongues 10 are engaged in the holes 11. The baits then have to be fixed to the convexities 15 since afterwards the inside is almost completely inaccessible. Finally, the upper base section 2 is folded around the centre part 1 which also forms the other side wall and the side wall section 4 placed on the side wall section 5 by folding. During this operation, the folded insert tabs 12 have to be inserted into the gaps which have been formed between the end wall sections 6 and the tabs 13. The bait box is now ready and can be placed in position.

In FIG. 2, the side wall corresponding to the center part of the cardboard cut-out is designated by the reference 1, the upper base section by the reference 2 and the lower base section by the reference 3. The end wall section is denoted by the reference 6 and is provided at the upper end of the insert tab 7 with tongue 10 which engages in the insert hole 11 in the lower tab 8. The reference 13 denotes the insert tab of the side wall 5 (not visible in this view) while the reference 12 denotes the insert tab of the side wall 4 (also not visible in this view).

I claim:

1. A blank for a rodent poison box, foldable into a single compartment container consisting essentially of sections for side walls, lower and upper base walls and end walls, each of said walls being separated from one another by fold lines, one side wall forming the center part of the blank, the other side wall being composed of two sections which can be placed one on top of the other, the inner side wall section of said two sections having tabs which can be folded inwardly and placed against the end wall sections from inside, the end wall sections being provided with lower insert tabs which can be placed against the lower base section from inside and upper insert tabs which can be placed against the end wall sections, at least one of the end wall sections being pre-punched with a slip hole to serve as an entrance and exit for the rodents, and the outer side wall section being provided with foldable insert tabs which can be inserted between the tabs of the inner side wall sections and the end wall sections.

2. A blank as clained in claim 1, wherein one of the wall or base sections is provided with an anchorage hole for the poison baits.

3. A blank as claimed in claim 2, wherein the anchorage hole is provided in the inner side wall section of said other side wall.

4. A blank as claimed in claim 3, wherein the anchorage hole is defined by convex projections of an elongated slot parallel to the base wall section.

5. A blank as claimed in claim 10, wherein the upper insert tabs of the end wall sections have cut out portions corresponding to the slip holes and are provided at their ends with tongues which after having been folded around the tabs of the inner side wall section of said other side wall, are engageable in holes formed in the lower insert tabs of the end wall sections in the vicinity of the fold lines.

6. A blank as claimed in claim 3, wherein the upper base section has pre-perforated inspection holes.

7. A blank as claimed in claim 3, wherein surfaces of the blank are covered with a water-repellant layer.

8. A single compartment rodent poison box formed of a set up blank according to claim 1.

* * * * *